Figure 1:
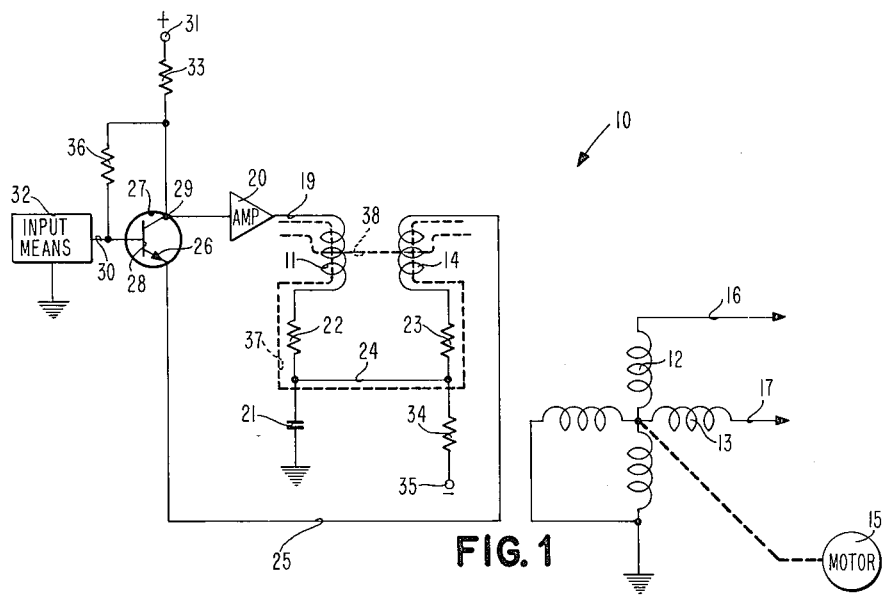

Aug. 3, 1965   J. O. COONEY, JR   3,199,019
FEEDBACK MEANS FOR SYSTEMS HAVING REACTIVE LOADS
Filed Sept. 22, 1960

INVENTOR
JOHN O. COONEY, JR.
BY Paul D. Carmichael
ATTORNEY

United States Patent Office 3,199,019
Patented Aug. 3, 1965

3,199,019
FEEDBACK MEANS FOR SYSTEMS HAVING REACTIVE LOADS
John O. Cooney, Jr., Waverly, N.Y., assignor to International Business Machines Corporation, New York, N.Y., a corporation of New York
Filed Sept. 22, 1960, Ser. No. 57,788
8 Claims. (Cl. 323—52)

The present invention relates generally to feedback means and more particularly to a highly improved feedback circuit for systems having large reactive loads.

The basic principles of feedback control are well known in the art. A signal corresponding to the present energized state of the load is returned by a feedback circuit and compared by suitable comparator means, such as an electronic amplifier, for example, to an input signal representing the desired energized state of the load. An error signal is produced which is employed to energize the load. In many instances the load is highly reactive, as in the sweep circuit of airborne radar equipment, for example.

A widely employed type of sweep circuit utilizes an electromechanical resolver which comprises a stator winding and a pair of rotor windings that are magnetically coupled. The rotor is positioned in accordance with the position of a directional radar antenna and a sweep voltage signal is utilized to drive the stator winding. The rotor windings are displaced ninety degrees with respect to each other whereby the outputs thereof may be used to energize the coordinate deflection means for the electronic beam of a plan position indicator (PPI) presentation. These coordinate deflection means may be either vertical and horizontal electromagnetic deflection coils or vertical and horizontal electrostatic deflection plates. A compensating winding is wound adjacent the stator and is positioned within the magnetic field coupling the stator and rotor windings. The compensating winding serves as a sensing element positioned within this magnetic field and is operative to produce a signal which corresponds to the changes taking place therein. The signal from the compensating winding is returned by a feedback circuit to suitable amplifying means where it is compared with the input signal and an error signal is generated which is utilized to energize the stator winding of the resolver.

A serious limitation in the above-described arrangement is that no path is provided for the direct current component of the feedback signal. The compensating winding is disposed in the magnetic field and all of the various windings of the resolver are referenced to ground whereby the feedback path is insensitive to direct current signals. A direct current feedback signal is required in resolvers where the amplifier is designed to operate at a high gain into the low frequency range since the gain cannot be reduced faster than a given rate from the selected cut-off frequancy without introducing excessive phase shifts in the feedback signal and resulting oscillations in the output of the amplifier. Also, various extraneous direct current inputs, due to variation in component parameters, power supply voltages, etc., are present and should be compensated for in the feedback arrangement.

A further serious limitation in the above arrangement is that the feedback path will transmit only a limited range of frequencies. This is because, as the frequency decreases, less and less voltage drop takes place across the reactive stator winding while more and more voltage drop is experienced across the internal resistance thereof. As a result, the lower frequencies are attenuated by the highly reactive components of the resolver. While this may not be objectionable where the input signal comprises a waveform of a single and relatively high frequency, it is highly objectionable where the input signal comprises a sweep waveform having a wide range of Fourier frequency components. It is necessary to faithfully return all such components in feedback to provide accurate outputs and to prevent oscillations in the amplifier.

The above limitations have long been recognized in the art and various arrangements have been proposed to mitigate the same. One such arrangement employs a sampling resistor in series with the stator winding and the signal developed across the sampling resistor is returned as a feedback signal. This does provide a limited feedback path for the lower frequency and direct current components of the feedback signal but the amount of such feedback is quite low, in the order of fifty to sixty percent.

Briefly, the present invention relates to a feedback arrangement for a system having a highly reactive load wherein signals of any and all frequencies are faithfully returned. One feedback path is provided for the low frequency and direct current components of the feedback signal while another feedback path is provided for the high frequency components of the feedback signal. The compensating winding disposed in the magnetic field between the stator and rotor windings senses the higher frequency components due to transformer action. The stator and compensating windings are connected in series and suitable circuit elements are provided to define a feedback path for the direct current and lower frequency components. By proper selection of circuit elements, the frequency response of the feedback circuit can be made uniform throughout an extended frequency range. The invention also relates to a feedback arrangement wherein the direct current voltage drop across the reactive load is maintained at an absolute minimum. The feedback circuit can be directly coupled to apparatus employing components whose parameters are subject to variation, such as transistor amplifiers, for example.

It is the primary or ultimate object of the present invention to provide feedback means for systems having reactive loads wherein the feedback means is operative to return in feedback an extended range of frequency components as well as the direct current component to provide an accurate and faithful feedback signal. The overall frequency response of the feedback means of this invention is much greater than that of prior art circuits for the same or similar purposes.

It is another object of the invention to provide feedback means for systems having reactive loads which employs a pair of feedback paths. One path is specifically adapted to conduct the direct current and lower frequency components, while the other path is adapted to return the higher frequency components of the feedback signal.

Yet another object of the present invention is to provide feedback means for systems having reactive loads wherein the direct current voltage drop across the reactive load is maintained within reasonable limits at all times. In resolver applications this is particularly important since saturation of the iron in the magnetic circuit due to a relatively large direct current voltage across the stator or primary winding will result in a distorted output.

A further object of the invention is to provide feedback means for systems having reactive loads which may be directly coupled to apparatus employing components whose parameters are subject to variation.

Still a further object of the invention is to provide feedback means of the type above described which is characterized by its extreme simplicity, its use of a minimum of components and its low cost.

The foregoing and other object, features and advantages of the invention will be apparent from the following more particular description of a preferred embodiment of the invention, as illustrated in the accompanying drawings.

Figure 2:
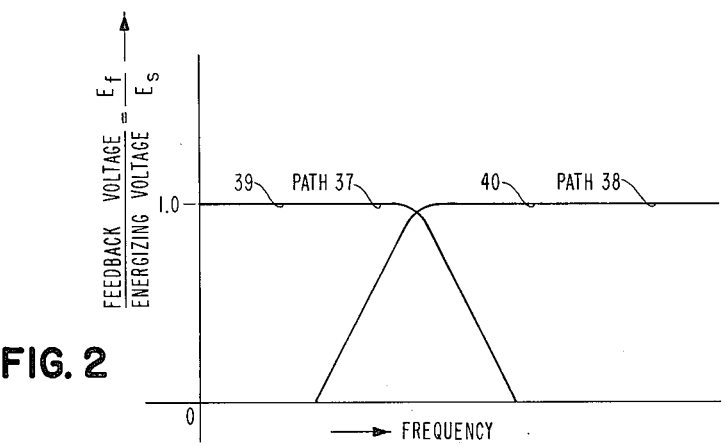

In the drawings:

FIG. 1 is a schematic circuit diagram of a system having a highly reactive load and employing feedback means constructed and arranged in accordance with the teachings of the present invention; and FIG. 2 is a graph showing the relationship between frequency and the feedback voltage divided by the energizing voltage for the circuit shown in FIG. 1.

Referring now to the drawings, and initially to FIG. 1 thereof, the reference numeral 10 designates generally a resolver having a stator or primary winding 11, a pair of rotor windings 12 and 13 and a compensating winding 14. The stator winding 11 and the rotor windings 12 and 13 are movably mounted with respect to each other and are magnetically coupled. The compensating winding 14 is disposed in the magnetic field coupling the stator and rotor windings and serves, as will be hereinafter more fully explained, as a sensing means for the feedback circuit.

The compensating winding 14 is usually wound in a bifilar manner with the stator winding 11 while the rotor windings 12 and 13 are displaced at ninety degrees with respect to each other. The rotor of the resolver is rotated by any convenient means, such as a motor 15. Resolvers, in and of themselves, are well known in the art and no claim is made to a resolver per se. For those desiring a more detailed description of resolvers and their operation, reference should be made to RICO Handbook No. 57, entitled "Resolver Handbook," which was published and coyprighted in 1954 by Reeves Instrument Corportion, 215 East 91st Street, New York 28, New York. Resolvers designated by model number R-151-HM of this corporation have been used in constructed embodiments of the invention.

The rotor windings 12 and 13 are referenced directly to ground while the other sides thereof are connected to the conductors 16 and 17, respectively, which serve as output means for the resolver. The arrangement is such that, due to the angular displacement of the rotor windings with respect to each other and the rotation of the rotor, the outputs observed on the conductors 16 and 17 will be displaced ninety degrees electrically and will vary sinusoidally as a function of the position of the rotor with respect to the stator.

One side of the stator winding 11 is connected by the conductor 19 to the output of an amplifier 20 while the other side thereof is referred to ground through a capacitor 21. A resistor 22 is shown disposed in series relation with the stator winding 11. This resistor represents the internal resistance of the stator winding and is separately depicted to facilitate the understanding of the operation of the invention.

The compensating winding 14 and its associated internal resistance 23 are connected in series with stator winding 11 and its internal resistance 22 by a conductor 24. The other side of the compensating winding is joined via conductor 25 to the emitter 26 of a transistor 27 and is also connected to a negative terminal 35 of a direct current voltage source through resistor 34.

The transistor 27 may actually comprise the first amplifying stage of the amplifier 20 and has, in addition to the emitter 26, a base 28 and a collector 29. The base 28 of the transistor is connected to an input conductor 30 leading to suitable input means 32. The collector 29 is connected with a positive terminal 31 of a direct current voltage source through a series resistor 33 and is maintained at a positive potential with respect to the emitter 26. The circuit can be traced from positive voltage terminal 31, resistor 33, collector 29, emitter 26, conductor 25, compensating winding 14, internal resistance 23, resistor 34 and thence to a negative terminal 35 of the direct current voltage source. The base 28 of the transistor is biased positive by a circuit comprising a resistor 36 connected between the collector 29 and the base. The transistor 27 is supplied with a feedback signal over the conductor 25 and is operative, when an input signal is supplied over conductor 30 from input means 32, to produce an error signal which is fed into the other stages of amplification of the amplifier 20. The resultant error signal appearing on the conductor 19 is a function of the difference between the input signal on conductor 30 and the feedback signal on the conductor 25. This error signal is utilized to energize the stator winding 11 of the resolver.

Considering now the operation of the apparatus above described, it will be assumed that initially no input signal is supplied over the conductor 30 and the collector 29 of the transistor 27 is held at a higher potential than the emitter 26 thereof. When an input signal is supplied to the base of transistor 27, the same is amplified and supplied over conductor 19 to the stator winding 11. Energization of the stator winding produces a magnetic field and output signals appear on conductors 16 and 17 due to the magnetic coupling between the stator and rotor windings. If the losses in the magnetic coupling are neglected, the outputs on conductors 16 and 17 will be signals displaced ninety degrees electrically from each other and will be a function of the relative angular displacement of the stator and rotor windings and the waveform utilized to energize the stator winding.

The energizing circuit for the stator winding 11 can be traced from conductor 19, through stator winding 11, internal resistance 22 and capacitor 21 to ground. This path is only available to the higher alternating current frequency components of the energizing signal since at higher frequencies the capacitance has a very low impedance. At lower frequencies the effective impedance of the capacitor is much higher and this impedance blocks the lower frequency and direct current components of the energizing signal from flowing to ground.

The direct current and lower frequency components are caused to flow across the conductor 24 and through the compensating winding 14 and its associated internal resistance 23 to the feedback conductor 25 as shown by the broken line 37 in FIG. 1. In this manner a path is provided for the direct current and lower frequency components through a circuit includnig the stator and compensating windings connected in series.

As previously mentioned, the compensating winding 14 is positioned in the magnetic field coupling the stator and rotor windings and serves as a means for sensing what is actually happening in the magnetic field to produce a feedback signal. The compensating winding 14 also performs other functions in the resolver with which we are not presently concerned. If the transformation ratio and other losses between the satator and compensating windings are equal to the transformation ratio and other losses between the rotor and stator windings, then the signal developed across the compensating winding is proportional to the output signals developed in the rotor windings.

The higher frequency components of the energizing signal for the stator winding flow therethrough to ground and set up a magnetic field. The compensating winding disposed in this magnetic field is energized to produce a signal on feedback conductor 25 which corresponds to the higher frequency components energizing the stator winding 11. This feedback path is indicated by the broken line 38 in FIG. 1. The lower frequency and direct current components are not induced in the compensating winding because the independence of the stator winding appears very low to the lower frequency components and most of the voltage drop takes place across the internal resistance 22 of the stator winding. Of course, the direct current component of the energizing signal for the stator winding cannot be induced in the compenstating winding by transformer action.

As previously set forth, the lack of the feedback path for the lower frequency and direct current components has seriously limited the utilization of systems employing reactive loads and feedback control. Without such frequency components the driving amplifier may become unstable and generate oscillations, the output may be distorted and the magnetic circuit may become saturated by an excessive direct current voltage drop across the stator winding due to variation in the parameters of associated components and extraneous inputs.

There are thus provided two feedback paths 37 and 38—the first for the lower frequency and direct current components and the latter for the higher frequency components. The feedback signal on conductor 25 is a summation of the signals appearing in the two feedback paths whereby the same contains all frequency components.

An analytical analysis of the feedback path 37 in the present circuit based on the assumptions that there is negligible or no coupling between the stator and compensating windings at low frequencies, the impedance of the compensating and stator windings are equal and the impedance of the capacitor is less than the impedance of either the compensating winding or the stator winding discloses that:

(1)
$$\frac{E_f}{E_s} = \left(\frac{R_{in}}{R_{23}+\omega L_c + R_{in}}\right)\frac{R_{34}}{R_{34}+\omega^2 L_s R_{34} C + \omega(L_s + R_{34}R_{23}C) + R_{22}}$$

where:

$E_f$ = feedback voltage supplied to emitter 26.
$E_s$ = voltage from amplifier output to ground.
$R_{in}$ = input resistance to ground of transistor 27 when looking at emitter 26.
$R_{23}$ = internal resistance 23.
$R_{22}$ = internal resistance 22.
$R_{34}$ = resistor 34.
$L_s$ = inductance of stator winding 11.
$L_c$ = inductance of compensating winding 14.
$C$ = capacitor 21.
$\omega = \pi 2$ times the frequency.

In the special case when only a direct current component is evidenced in this feedback circuit all terms containing $\omega$ will be equal to zero and Equation 1 becomes:

(2)
$$\frac{E_f}{E_s} = \left(\frac{R_{in}}{R_{23}+R_{in}}\right)\frac{R_{34}}{R_{34}+R_{22}}$$

It will be noted that if the input resistance to ground of transistor 27 when looking at its emitter 26 is much larger than the internal resistance 23 of the compensating winding and if resistor 34 is much larger than the internal resistance 22 of the stator, then $E_f$ over $E_s$ will be approximately equal to one which indicates that the direct current feedback approaches 100 percent of the energizing signal. As the frequency increases from zero the terms of Equation 1 containing $\omega$ will increase. At a certain frequency, depending primarily upon the value of the capacitor 21, the feedback signal conducted over feedback path 37 will decrease sharply. The general shape of the frequency response of the feedback path 37 is represented by the line 39 on the graph shown in FIG. 2.

The frequency response of the magnetically coupled feedback path 38 is also shown on the graph and this response is represented by the line 40. It will be noted that the response of path 38 falls off very sharply at the lower frequencies for the reasons explained above. The meaning of these two frequency response curves is that, upon proper selection of the value of various circuit elements and in particular the value of capacitor 21, the circuit is responsive to all frequencies and has a substantially flat frequency response curve over its entire operating range.

The circuit arrangement shown in FIG. 1 is adapted to be employed in airborne radar equipment. The rotor of the resolver would be rotated in accordance with the movement of the directional tracking antenna and the input signal supplied over the conductor 30 would be the sweep waveform which is generated by the radar ranging gate. The output signals of the rotor windings would be connected to the deflection means for the electron beam of a cathode ray tube display whereby the electron beam is intensified to cause the appearance of a luminous spot in a portion of the cathode ray tube corresponding to the range being presented.

However, it should be clearly understood that the teachings of the present invention are adapted for use whenever a system having a reactive load requires feedback means providing an extended frequency response characteristic. For example, the load may comprise the deflection coil of a cathode ray tube and a sense winding would be wound adjacent this coil. Also, the load may be a driving coil for a loudspeaker in an audio reproducing system and a sense winding would be positioned adjacent this coil.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A sweep circuit for radar apparatus and the like comprising a resolver, said resolver having a pair of rotor windings, a stator winding and a compensating winding, said stator winding and said rotor windings being magnetically coupled, said compensating winding being positioned within the magnetic field between said stator winding and said rotor windings, amplifier means, said amplifier means being connected to said stator winding, input means for supplying a sweep waveform to said amplifier means, feedback means for supplying a feedback signal to said amplifier means, said amplifier means providing an energizing signal to said stator winding which is proportional to the difference between said sweep waveform and said feedback signal, said stator winding and said compensating winding being connected in series relation in a closed feedback loop around said amplifier means, a capacitor having one terminal referenced to ground and the other terminal connected between said stator winding and said compensating winding to define a low impedance path to ground for the higher frequency components so that the higher frequency components of said feedback signal are transmitted through a magnetic circuit comprising said stator winding and said compensating winding, and said capacitor defining a high impedance path to ground for the lower frequency and direct current components so that the lower frequency and direct current components of said feedback signal are conducted through the series connected stator winding and compensating winding.

2. Apparatus according to claim 1 further characterized in that said amplifier means comprises at least one transistor having a base, an emitter and a collector, said input means being connected to said base, said emitter being connected to said feedback means, said collector being connected to said stator winding, and means to impress a potential across said collector and said emitter.

3. Apparatus according to claim 1 further characterized in that said amplifier means comprises at least one transistor having a base and a pair of terminals, said input means being connected to said base, one of said terminals being connected to said stator winding, said feedback means being connected to the other of said terminals, and means to impress a potential across said terminals.

4. A sweep circuit for radar apparatus and the like comprising a resolver, said resolver having a stator winding and a compensating winding, said stator winding and said compensating winding being magnetically coupled, comparator means connected to said stator winding, input means for supplying an input signal to said comparator means, feedback means for supplying a feedback signal to said comparator means, said comparator means providing an energizing signal to said stator winding which is a function of said input signal and said feedback signal, said feedback means comprising said stator winding and said compensating winding connected in series relation in a closed feedback loop about said comparator means, and impedance means connected to a reference potential and to said feedback means between said stator winding and said compensating winding providing a low impedance path for only the higher frequency components of said energizing signal so that the higher frequency components of said feedback signal are transmitted by the magnetic coupling between said stator winding and said compensating winding and the lower frequency and direct current components of said feedback signal are conducted through the series connected stator winding and said compensating winding.

5. Apparatus according to claim 4 further characterized in that said impedance means comprises a capacitor.

6. A feedback system for controlling the energization of a reactive element comprising:
  input means for supplying an input signal;
  comparator means coupled to said input means and responsive to said input signal and a feedback signal to supply an energizing signal to said reactive element;
  sensing means magnetically coupled to said reactive element and operable to supply first feedback signal frequency components in response to changes in the magnetic field produced by said reactive element;
  circuit means connected to said reactive element for supplying second feedback signal components in response to energization of said reactive element; and
  feedback means connecting said sensing means and said circuit means to the comparator for supplying a feedback signal to said comparator which includes both the first and second feedback signal frequency components.

7. The invention defined in claim 6 wherein said circuit means includes a direct circuit coupled between the reactive element and the feedback means and shunt means connected to said direct circuit in bypassing relation with said feedback means to bypass certain frequency components of signals transmitted through said direct circuit.

8. The invention defined in claim 7 wherein said shunt means comprises a capacitor.

References Cited by the Examiner

UNITED STATES PATENTS

| 2,919,379 | 12/59 | Frame | 315—24.1 |
| 2,974,270 | 3/61 | Christiansen | 323—22 |
| 3,011,119 | 11/61 | Starks-Field et al. | 323—53 |

LLOYD McCOLLUM, *Primary Examiner.*

L. MILLER ANDRUS, *Examiner.*